July 12, 1960     E. HOFMANN     2,944,446
APPARATUS FOR CARRYING OUT BORINGS, THREADINGS AND MILLINGS
Filed Oct. 24, 1958
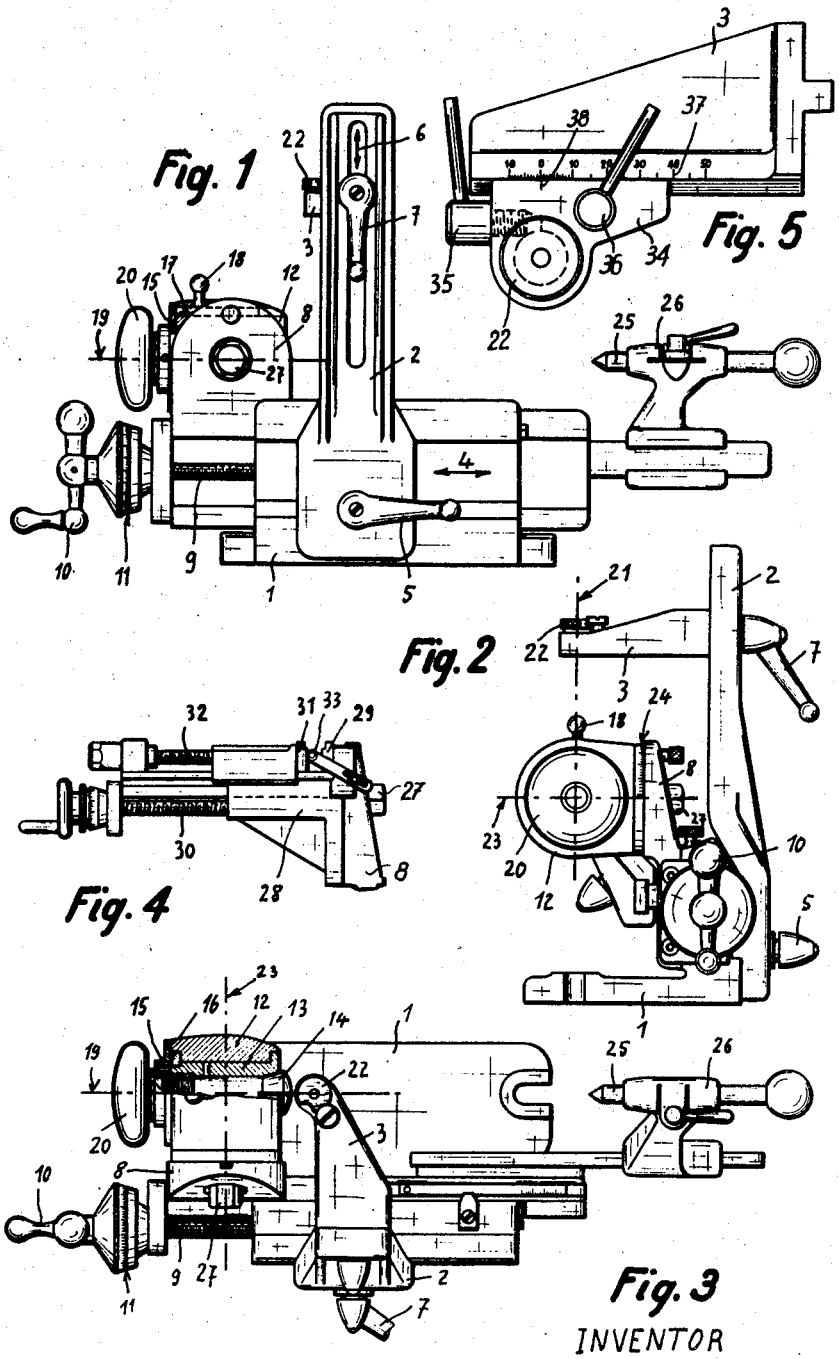
INVENTOR
ERNST HOFMANN
BY
ATTORNEY 2,944,446
APPARATUS FOR CARRYING OUT BORINGS, THREADINGS, AND MILLINGS Ernst Hofmann, Neuchatel, Switzerland, assignor to E. Hofmann & Cie S.A., Saint-Blaise, Neuchatel, Switzerland, a firm Filed Oct. 24, 1958, Ser. No. 769,506

3 Claims. (Cl. 77—64)

The present invention relates to an apparatus for effecting borings, threadings and millings.

This apparatus is characterised by the feature that it comprises a frame carrying an L-shaped support intended to receive a rotatable tool, a chuck for holding the workpiece, carried by a divider, the chuck and the divider being mounted on the frame in such a way as to be able to be moved angularly around an axis perpendicular to a plane which includes the axis of the tool and the axis of the divider.

In the accompanying drawing:

Figure 1 is an elevational view of the apparatus according to the present invention;

Figures 2 and 3, respectively, are, a side view and a plan view corresponding to Figure 1;

Figure 4 is a side view of an accessory of the apparatus, in the preceding figures; and Figure 5 is a plan view of a modified form of apparatus constructed in accordance with the present invention.

The apparatus shown in Figures 1 to 4 comprises a frame 1 on which is mounted an L-shaped support comprising an upright 2 and an horizontal arm 3. The upright 2 can slide on the frame 1 as indicated by the arrow 4. A locking handle 5 allows the upright to be locked in desired position of adjustment relative to the frame. The horizontal arm 3 is slidable along the upright 2 in accordance with arrow 6 and a handle 7 allows the horizontal arms to be locked in the position desired.

The frame 1 carries a sliding member 8 which can be moved parallel to the path of sliding adjustment of the upright 2. A screw 9, operated by means of a handle 10, controls the displacement of the sliding member 8. A micrometric drum 11 allows precise control over the latter displacement. The sliding member 8 carries a headstock 12 in which is rotatably mounted a sleeve 13 constituting the main body of a chuck 14 intended to grip the workpiece, not shown. The sleeve 13 is rigid with a divider comprising a disk 15 provided with a series of holes 16 which accommodate a pin 17 that can be moved axially by means of a control button 18. By steps represented by the series of holes, the workpiece thus can be rotated on its axis which coincides with the axis 19 of the chuck 14. A handwheel 20 makes it possible to tighten and to loosen the chuck, and to rotate the divider when the pin 17 is disengaged from the holes 16 of the disk 15. The axis 19 intersects the axis 21 of a boring sleeve 22 carried by the arm 3 of the L-shaped support. Sleeve 22 is intended to receive a rotatable tool, for example a boring drill.

The headstock 12 is also rotatably mounted to rotate on an axis 23 perpendicular to the plane constituted by the axes 19 and 21. The angular position of the headstock 12 on the sliding member 8 can be checked by means of an index 24 (Figure 2). One can thus, by rotating the headstock 12 around axis 23, modify the angle between the axis of the tool and the axis of the workpiece. The apparatus comprises moreover a tail-stock 25 carried by a head 26 slidably mounted on the frame 1 of the apparatus. The axis of this tail-stock is situated in the plane including the axes 19 and 21.

The headstock 12 is removably mounted on the sliding member 8. For disassembling it, it suffices to unscrew a nut 27. The headstock can then be replaced by a vise constituting an accessory of the apparatus, allowing grip of workpieces of various shapes which cannot be easily gripped by the chuck 14. This vise, represented in Figure 4, comprises a support 28 secured to the sliding member 8. The position of the fixed jaw, designated by 29, on the support 28, can be adjusted by means of a micrometric screw 30. The tightening and the loosening of the movable jaw 31 are controlled by a screw 32. When operating the screw 30, the position of the workpiece is modified laterally. The angular position of the support 28 on the sliding member 8 also can be modified to give a certain inclination to the vise. An adjustable abutting member 33 allows the axial position of the workpieces gripped in the vise to be determined.

The modification of Figure 5 distinguishes from the first embodiment by the feature that the sleeve 22 intended to receive the rotatable tool is not mounted directly on the horizontal arm 3 of the L-shaped support, but is mounted on a bracket 34 slidingly mounted on the horizontal arm 3. A locking screw 35 prevents the sleeve 22 from moving on the bracket. A handle 36 enables the bracket 34 to be locked in desired position of adjustment on the horizontal arm 3. The relative position of the bracket with respect to the horizontal arm can be checked by means of a graduation 37 on the bracket and a scale 38 indicated on the horizontal arm.

What I claim is:

1. In an apparatus for achieving borings, threadings, millings, or the like, a frame, an L-shaped support carried by said frame and having an arm to receive a rotatable tool, a member slidably mounted on said frame for sliding toward and away from said L-shaped support, a chuck for gripping a workpiece, and a divider carrying said chuck, said divider and said chuck being rotatably mounted on said member, for being displaced angularly on an axis perpendicular to a plane including the axis of the tool and the axis of the divider and having a position of angular adjustment where the axes of the chuck and tool are substantially perpendicular to each other for operations to be performed on the workpiece.

2. In an apparatus for achieving borings, threadings, millings, or the like, a frame, an L-shaped support slidably mounted on said frame and having an arm to receive a rotatable tool, a member slidably mounted on said frame for sliding independently of and substantially parallel to said L-shaped support, a chuck for gripping a workpiece, and a divider carrying said chuck, said divider and said chuck being rotatably mounted on said member, for being displaced angularly on an axis perpendicular to a plane including the axis of the tool and the axis of the divider and having a position of angular adjustment where the axes of the chuck and tool are substantially perpendicular to each other for operations to be performed on the workpiece, and a tail stock carried by said frame for selective use and having an axis susceptible to being aligned with the axis of said chuck through rotation of said divider and chuck on said member.

3. In an apparatus for achieving borings, threadings, millings, or the like, a frame, an L-shaped support slidably mounted on said frame and having an arm, said arm including a slidably adjustable bracket to receive a rotatable tool, a member slidably mounted on said frame to slide independently of and substantially parallel to said L- shaped support, a chuck for gripping a workpiece, and a divider carrying said chuck, said divider and said chuck being mounted on said member, for being displaced angularly on an axis perpendicular to the plane parallel to the axis of the tool and the axis of the divider and having a position of angular adjustment of the chuck where with sliding adjustment of the bracket the axes of the chuck and tool are substantially perpendicular to each other for operations to be performed on the workpiece.

References Cited in the file of this patent

UNITED STATES PATENTS 2,484,758     Sonnie  ---------------- Oct. 11, 1949